United States Patent [19]

Monk

[11] 4,291,677
[45] Sep. 29, 1981

[54] SOLAR ENERGY COLLECTOR

[76] Inventor: Robert J. Monk, 175 Shadybrook, Cedar Hill, Tex. 75104

[21] Appl. No.: 944,865

[22] Filed: Sep. 22, 1978

Related U.S. Application Data

[63] Continuation-in-part of Ser. No. 864,617, Dec. 27, 1977, Pat. No. 4,161,942.

[51] Int. Cl.³ .................................................. F24J 3/02
[52] U.S. Cl. ..................................... 126/438; 126/424; 350/295
[58] Field of Search ............... 126/424, 425, 438, 439, 126/451; 350/292, 293, 298, 299, 310, 295

[56] References Cited

U.S. PATENT DOCUMENTS

| | | | |
|---|---|---|---|
| 1,814,897 | 7/1931 | Coxe | 126/438 |
| 2,906,257 | 9/1959 | Abbot | 126/438 |
| 2,968,033 | 1/1961 | Kreitzberg | 126/438 |
| 3,049,055 | 8/1962 | Tubbs | 126/438 |
| 3,406,404 | 10/1968 | Maier | 126/438 |
| 3,717,879 | 2/1973 | Ganssle | 350/292 |
| 4,015,585 | 4/1977 | Fattor | 126/438 |
| 4,066,062 | 1/1978 | Houston | 126/424 |
| 4,173,397 | 11/1979 | Simpson | 126/438 |

Primary Examiner—James C. Yeung

[57] ABSTRACT

A solar energy collector comprising a parabola shaped mirror formed a plurality of flexible reflective film strips stretched over a plurality of supports being arranged to position the film in a parabola shape. The supports are held in place by a plurality of trusses. The mirror is pivotally secured to a support assembly whereby the mirror can be maintained at the same relative position to the sun. Positioning of the mirror is controlled by an energy rays tracking device. The supports are adjustable such that light and infrared energy rays striking the film between the supports are reflected to the focus of the mirror around which a collector assembly is located. The collector assembly comprises a surface coated with a black substance which is capable of maximum heat absorption from the light and infrared energy rays; and, a contained fluid passing in contact with said surface absorbs and transfers the heat in order that useful work can be obtained therefrom. The collector assembly is hermetically sealed to minimize heat losses from convection.

17 Claims, 19 Drawing Figures

SOLAR ENERGY COLLECTOR

CROSS REFERENCE TO RELATED APPLICATIONS

This application is a continuation-in-part of my copending application Ser. No. 864,617 filed Dec. 27, 1977, U.S. Pat. No. 4,161,942 entitled "Solar Energy Collector".

BACKGROUND

Because of shortages of fossil fuels and the hazards of nuclear fuels, solar energy has become a desirable source of fuel. However, one problem facing the collection and transfer of solar energy is the cost involved in building the collectors. Two types of concentrating collectors exist, the lens type which optically focuses the light and infrafed energy rays and the reflective type to focus light and infrared energy rays. Heretofore, concentrating reflective type reflectors have been built of aluminum, ceramics, and other costly type materials which require a large capitol investment to realize the suns potential energy.

Heretofore, there have been some temporary mirrors which have flexible support structures such that the mirror can be collapsed. However, these structures suffer from inaccurate alignment and reduced efficiency. In addition, these structures do not provide any means to adjust the tension of the reflective surface to compensate for changes in temperature.

SUMMARY OF THE INVENTION

I have devised a solar energy collector comprising a parabola shaped mirror arranged to reflect light and infrared energy rays to a collector assembly positioned around the focus of the mirror. The mirror comprises a plurality of flexible reflective film strips stretched over a frame formed by a plurality of supports. The supports are held in place by adjustment posts secured to a plurality of trusses which extend out from a central support structure positioned between the focus and the vertex of the parabola shaped mirror. The film is secured at each end around rollers which have a ratchet lock to limit rotation and control the tension of the film stretched over the supports. The supports are adjusted such that the light and infrared energy rays which strike the film between the supports is reflected toward the focus of the mirror where the collector assembly is located. The parabola shaped mirror may be constructed in two geometrically different forms. The first form is a circular parabola shape about its geometrical axis extending through the focal and vertex points of the parabola. The second form is a linear parabola shape in a straight line direction perpendicular to a plane containing the parabola shape and along the focal and vertex lines of the parabola. The circular paraboloid shaped mirror is supported on a horizontally positioned shaft rotatably held by a support assembly to provide elevation rotational movement of the mirror and with the support assembly being rotatable about a center pivot whose centerline is vertically positioned to provide bearing rotational movement of the mirror. Rotations of the circular paraboloid shaped mirror are controlled automatically by an energy rays tracking device to provide complete and accurate tracking of the sun during the day and to provide repositioning and cleaning of the mirror during the night in preparation for the following days tracking sequence. The linear parabola shaped mirror is supported on a shaft rotatably supported on a fixed or adjustable support assembly to provide rotational movement of the mirror. The shaft with the attached mirror when supported on a fixed support assembly is inclined to the horizon whereby an imaginary line positioned perpendicular to the focal and vertex lines of the parabola will intersect with the position of the sun when it is noon during equinox. The shaft with the attached mirror when supported on an adjustable support assembly will be automatically or manually inclined whereby an imaginary line positioned perpendicular to the focal and vertex lines of the parabola will always intersect with the sun at noon. Rotations of the linear parabolic shaped mirror are controlled automatically by an energy rays tracking device to provide complete and accurate tracking of the sun during the day and to provide repositioning and cleaning of the mirror during the night in preparation for the following days tracking sequence.

The flexible reflective film forms a highly reflective mirror which is readily cleanable and able to withstand atmospheric elements and yet is flexible to allow adjustment and positioning of the film in such a way as to compensate for manufacturing tolerances in the frame and support structure.

The primary object of the invention is to provide a concentrating type solar energy collector containing a mirror which is constructed of flexible film to minimize manufacturing cost.

A second primary object is to provide a collector capable of producing extremely high temperatures in order to improve the quantity of useful work capable of being derived therefrom; and, to permit better control of heat losses from the collector assembly since it is relatively small in size when compared to flat plate collectors.

A still further object of the invention is to provide a mirror which is constructed of inexpensive material which is flexible allowing adjustment of every segment of the reflective material to compensate for manufacturing tolerances which would otherwise require regrinding of a mirror constructed of conventional materials.

Other and further objects of the invention will become apparent upon referring to the detailed description hereinafter following and drawings annexed hereto.

BRIEF DESCRIPTION OF THE DRAWING

Drawings of two preferred embodiments of the invention are annexed hereto so that the invention may be better and more fully understood; in which.

Numeral references are used to designate like elements throughout the various figures of the drawings.

DESCRIPTION OF A FIRST PREFERRED EMBODIMENT

Figure 1:
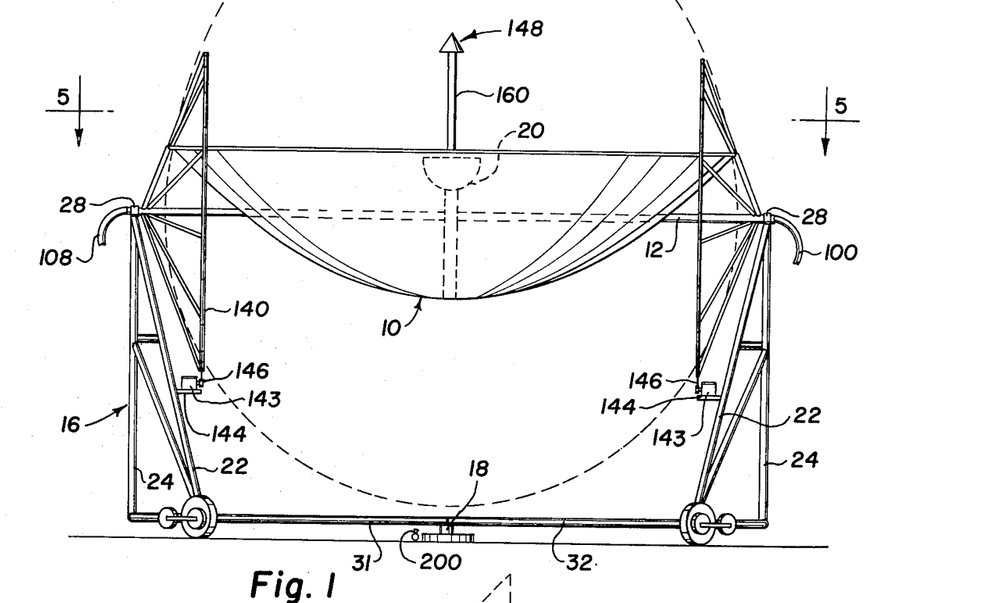
FIG. 1 is a front elevational view of a solar energy collector with a circular paraboloid shaped mirror and support assembly.
Figure 2:
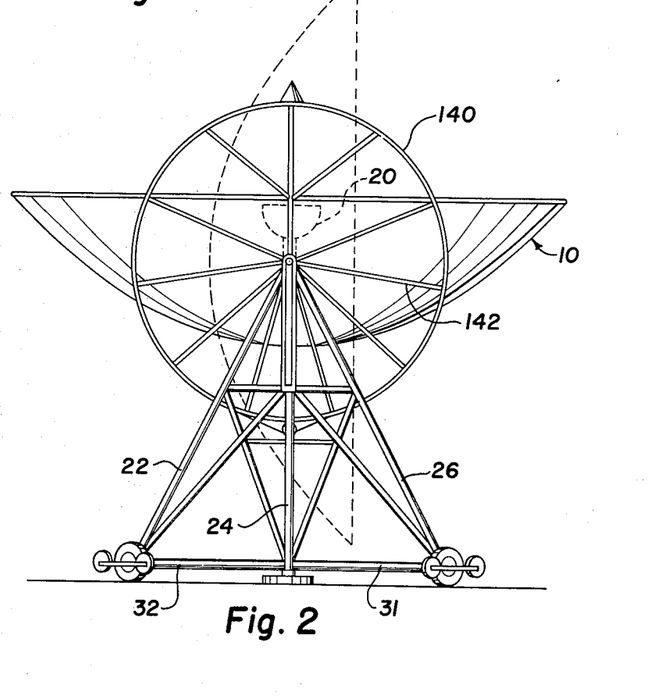
FIG. 2 is a right side elevational view.
Figure 3:
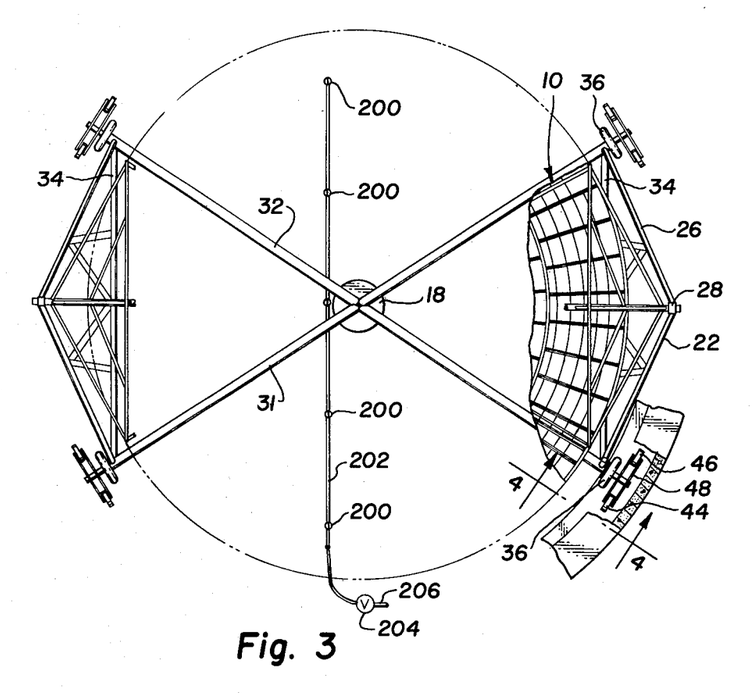
FIG. 3 is a plan view thereof.

Referring to FIGS. 1-3, the solar energy collector generally comprises a circular paraboloid shaped mirror 10 pivotally supported by shaft 12 which is pivotally secured to a support assembly generally designated 16. Shaft 12 is horizontally positioned to provide elevation rotational movement of mirror 10. The support assembly 16 is rotatable about a center pivot 18 whose centerline is vertically positioned to provide bearing rotational movement of the mirror 10 and the support assembly 16.

The circular paraboloid shaped mirror 10 reflects light and infrared energy rays toward the collector assembly 20 which is located around the focal point of the mirror.

Figure 4:
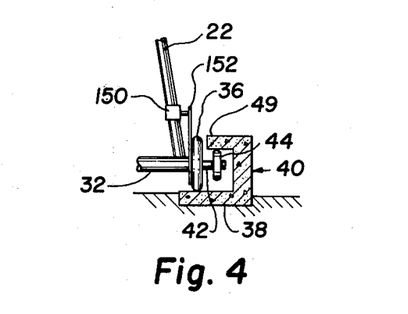
FIG. 4 is an enlarged cross-sectional view taken along line 4—4 of FIG. 3.

The support assembly 16 generally comprises upwardly extending support members 22, 24 and 26 arranged in a triangular configuration on each end of mirror 10. A bearing 28 is secured at the top apex of the frame to rotatably support shaft 12. Upwardly extending members 22, 24 and 26 are secured to each side of a lower frame comprised of two crossing axles 31 and 32 secured by connector member 34 at each end. The axles 31 and 32 are supported by bearing wheels 36 secured to the ends of each axle 31 and 32. As illustrated in FIGS. 3 and 4, bearing wheels 36 are supported by a flange 38 of guide channel 37. A stub shaft 39 rotatably supports a pair of guide wheels 41 and 43 secured by leaf springs 45 to stub shaft 39. The guide wheels 41 and 43 exert an upward force against channel flange 49 to limit upward movement of the support assembly 16.

Figures 6, 7, 8, 9:
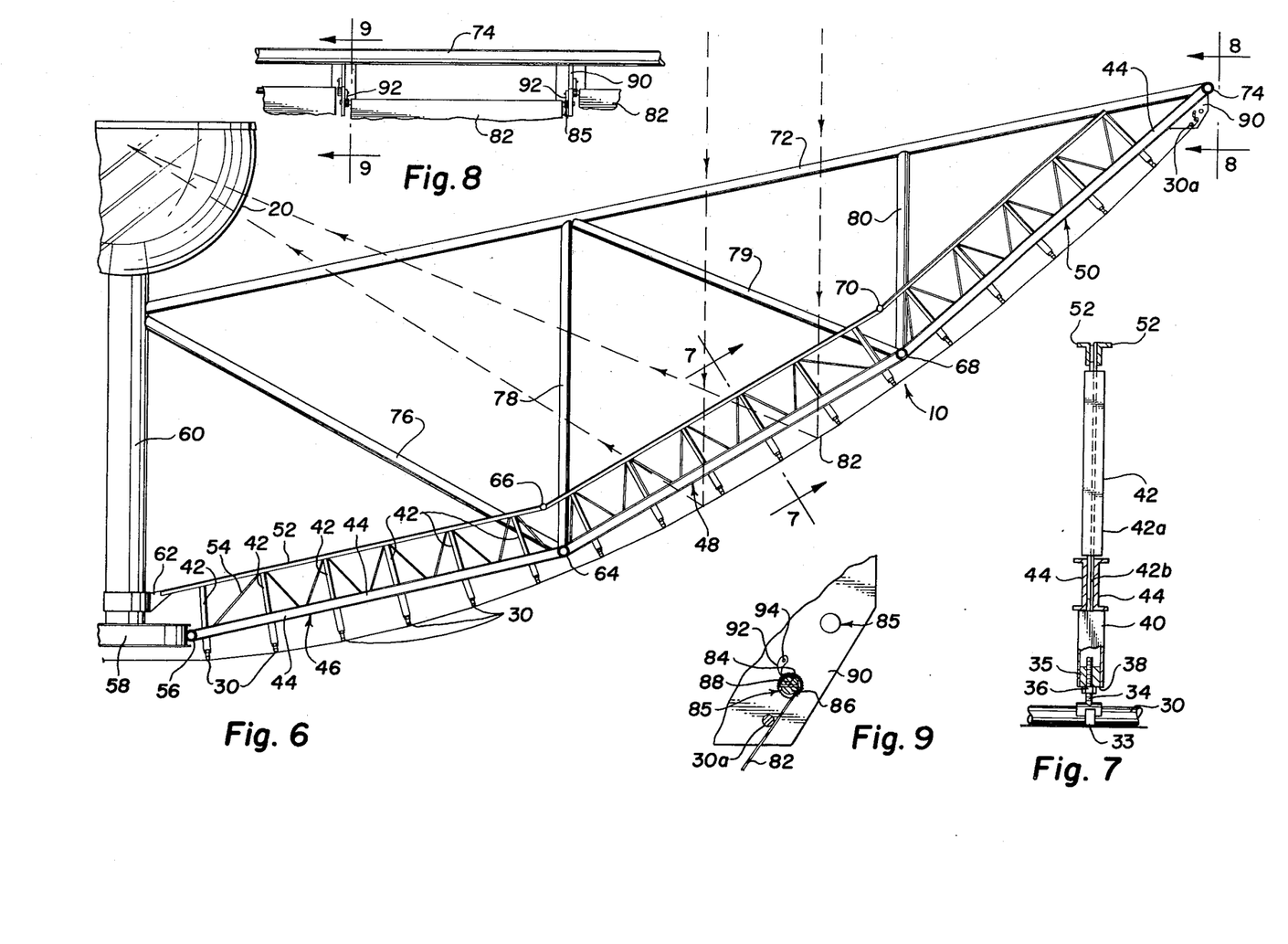
FIG. 6 is a cross-sectional view taken along line 6—6 of FIG. 5.
FIG. 7 is an enlarged cross-sectional view taken along line 7—7 of FIG. 6.
FIG. 8 is an enlarged end view taken along line 8—8 of FIG. 6.
FIG. 9 is a cross-sectional view taken along line 9—9 of FIG. 8.

The mirror frame is comprised of a network of concentrically arranged support rings 30. The rings 30 are secured by a plurality of clamps 33 to a plurality of screws 53 threadedly secured through an insert 35 having a threaded passage therethrough as best illustrated in FIG. 7. The screws 53 are spaced about the circumference of rings 30. Inserts 35 are secured in one end of hollow square channels 40. It should be readily apparent that by turning screws 53 in inserts 35, the relative distance between surface 47 and the surface of the ring 30 may be adjusted. Nuts 51 lock the screws 53 in position. An outer support ring 30a is secured in fixed position to brackets 90 secured to C-shaped channels 44 of trusses 50.

The hollow square channels 40 receive the stem and flange of T-shaped members 42. Flange 42a of members 42 have a portion thereof removed so that the stem 42b is positioned between the webs of two C-shaped channels 44 of three sets of bar joist trusses 46, 48 and 50 which form the primary radial support for the rings 30.

The bar joist trusses 46, 48 and 50, as best illustrated in FIG. 6, which resist wind loading from the back side of the mirror 10 and which resist compression loading due to tensioning of the strips of flexible reflective film 82, are generally extending radially outward from the geometrical axis of the mirror in staggered spaced relation and generally comprise C-shaped channels 44 in compression, L-shaped angles 52 in tension, connecting T-shaped member 42 and a zig zag bar 54 welded or otherwise secured to channels 44 and angles 52 for bracing and connecting same.

Trusses 46 have C-shaped channels 44 secured to a connector ring 56 secured to beams 58 secured to the central support structure 60. The L-shaped angles 52 are secured by bracket 62 to central support structure 60. Trusses 46 are secured b between connector rings 56 and bracket 62 to a second pair of spaced connector rings 64 and 66 in spaced intervals of 15 degrees. Trusses 48 are secured between connector rings 64 and 66 and connector rings 68 and 70 in spaced intervals of 10 degrees. Trusses 50 are secured between connector rings 68 and 70 and outer connector ring 74 and radial support 72 in spaced intervals of 7½ degrees. Braces 76, 78, 79 and 80 are secured between the central support structure 60, connector rings 64 and 68 and the radial support 72.

The central support structure 60 supports the collector assembly 20 which is located around the focal point of the mirror 10. Support rings 30 are adjustable such that the area of exposed flexible reflective film 82 between any pair of the support rings 30 will reflect the light and infrared energy rays received from the sun to strike the collector assembly 20 as shown in dashed outline in FIG. 6. The reflective surface of the mirror 10 is formed by a flexible reflective film 82 such as that sold under the trademark of 3M Company of Minnesota. The film 82 is inexpensive and has a highly reflective and flexible surface which renders the surface easily adjustable. The film 82 generally comes in specified widths such as two feet and is generally long enough to go from one side of the circular paraboloid mirror 10 to the other. It should be readily apparent that a number of strips of film 82 are used between rollers 82 spaced around the circumference of circular paraboloid mirror 10. The number of strips of film 82 is determined by the circumference of circular paraboloid mirror 10.

The first end 84 of film 82 is secured between segments 86 and 88 of roller 85 which are journalled through apertures formed in brackets 90 secured between two C-shaped channels 44 as best illustrated in FIGS. 8 and 9. The film 82 is stretched over support rings 30 and support ring 30a to the opposite side of circular paraboloid shaped mirror 10 to another roller 85 diametrically opposed to where the first end 84 of film 82 is secured. Teeth are formed on the ends of rollers 85 such that rotation of rollers 85 will engage rachet lock 92 pivotally secured on pin 94 to brackets 90 to prevent unwinding of rollers 85. This provides a means to control the tension of the film 82 over support rings 30 and therefore controls the amount of wind load which the mirror 10 can receive from the reflective side of film 82. It should be readily apparent that the reflective side of the film 82 will be positioned against the support rings 30 such that light and infrared energy rays are reflected toward the collector assembly 20. The film 82 may be strengthened by securing a flexible backing material such as mylar to the non-reflective side of the film.

Figure 10:
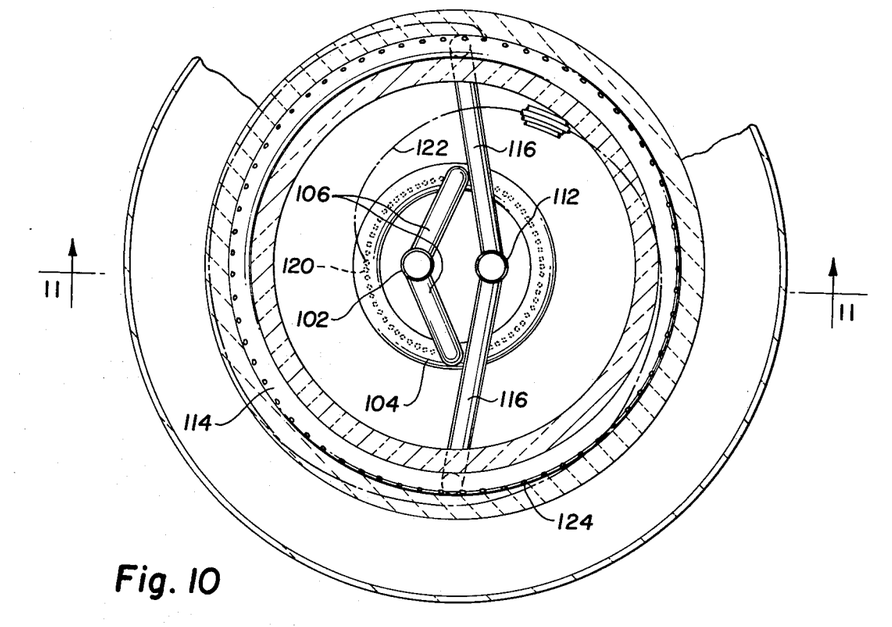
FIG. 10 is a cross-sectional view taken along line 10—10 of FIG. 6.
Figure 11:
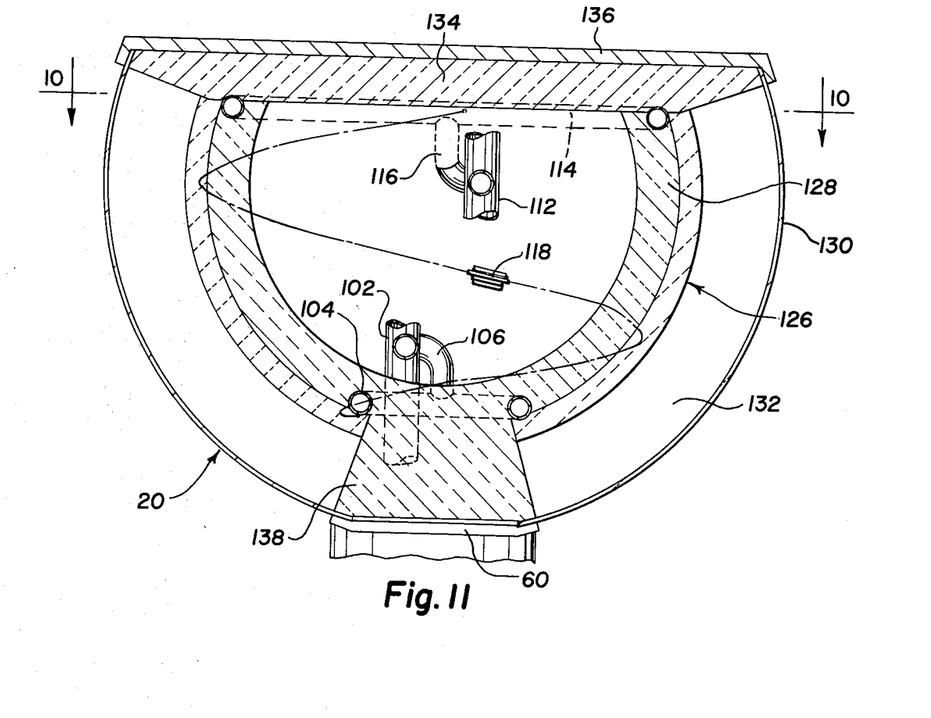
FIG. 11 is a cross-sectional view taken along line 11—11 of FIG. 10.

A flexible inlet line 100 carries the heat transfer media to the collector assembly 20 as shown in FIG. 1. Fluid passes through flexible inlet line 100 positioned through shaft 12, through the central support structure 60 and then to collector assembly 20. Supply tube 102 communicates with flexible inlet line 100 and inlet manifold 104 through lines 106 as shown in FIGS. 10 and 11. A flexible outlet line 108 is secured in a similar manner through shaft 12 through the central support structure 60 to outlet tube 112 which communicates with outlet manifold 114 through lines 116.

Inlet manifold 104 communicates with outlet manifold 114 through a plurality of helically arranged tubes 118 which are secured in apertures 120 formed in inlet manifold 104 and spiral round in a helical path similar to that shown in dashed outline 122 and communicate with apertures 124 formed in outlet manifold 114. The tubes 118 are nested as closely as possible as allowed by manufacturing tolerance. Only a portion oof the tubes 118 are illustrated but all the tubes follow a similar path to that shown in dashed outline. The tubes 118 form a semispherical heat transfer layer 126 which is coated with a compound of a refractory material and carbon black to form a heat transfer agent which absorbs heat from the light and radiant energy rays and transfers the heat to the tubes through which a heat transfer media is passing. A layer of insulation 128 is formed on the interior side of the heat transfer layer 126 to minimize conduction heat losses. A transparent lens 130 provides a cover and a partial vacuum is formed in the space 132 between the transparent lens 130 and heat absorbing layer 126 to minimize convection heat losses. An insulating cover 134 is formed just under a cover 136 which protects the top from weather elements. A base 138 is secured to the central support structure 60 to support the collector assembly 20.

The heat transfer media is pumped through heat exchangers whereby the heat therefrom is utilized to satisfy requirements for energy which are presently being supplied from fossil fuels. Alternates to the described use of a heat transfer media passing through the collector assembly 20 will be the direct conduction of heat from the collector to a user of heat by means of highly conductive materials where the distance between the collector and the user is relatively close or by direct conversion of the heat at the collector to another energy means which can be more readily transferred between the collector and the user. Heat from the collector assembly 20 is capable of being stored in highly insulated reservoirs or by conversion of the heat to other energy means such as potential or kinetic which can be stored for longer periods of time with no loss or smaller losses.

Means to provide elevation rotational movement of the circular paraboloid shaped mirror 10 generally comprises a ring 140 supported by spokes 142 on shaft 12 best shown in FIG. 2. A reversible motor 143, with a sprocket wheel fixed on the drive shaft thereof, is secured on support member 144 to upward extending members 22 and 26 on each end of support assembly 16 and is drivingly connected by a roller chain or other connector means 146 to the ring 140. Ring 140 is constructed of a U-shaped member whose outwardly extending legs restrain the connection means 146 from lateral movements in directions parallel to the centerline of shaft 12. Teeth welded or otherwise secured to ring 140, engage with connector means 146 to prevent slippage between ring 140 and connector means 146. Actuation of reversible motor 143 results in rotation of shaft 12 and the mirror 10 secured rigidly thereto is capable of being rotated through 360° as illustrated in FIG. 2 by dashed outline of the mirror. Means to provide bearing rotational movement of the circular paraboloid shaped mirror comprises reversible motors 150, with a sprocket wheel fixed on the drive shaft thereof, secured to upward extending members 22 and 26 and drivingly connected by roller chain 152 to a second sprocket wheel rigidly connected with wheels 36 as illustrated in FIG. 4. Actuation of reversible motors 150 results in movement of the wheels 36 around a circular track formed by flange 38 of guide channel 37. Movement of wheels 36 results in the rotation of axles 31 and 32 supporting same about center pivot 18 providing the required bearing rotational movement of the support assembly and the mirror. Motors 143 are simultaneously actuated and motors 150 are simultaneously activated by an energy rays tracking device to maintain the geometrical axis of the circular paraboloid shaped mirror 10 in alignment with the center of the sun for maximum energy collection.

Means to clean the surface of mirror 10 comprises a plurality of spaced spray heads 200 connected to a supply conduit 202 as best illustrated in FIG. 3. Supply conduit 202 is connected to control valve 204 which is connected by line 206 to a source of cleaning fluid such as water. At night the mirrors are automatically repositioned by the energy rays tracking device to be ready for the following days sun tracking sequence; and, during this repositioning the mirrors are positioned facing toward the spray heads 200 for automatic intermittant spraying of the flexible reflective film 82 to clean same.

The light and infrared energy receiving means 148 of the energy rays tracking device is mounted on a staff 160 secured to mirror 10 as best illustrated in FIG. 1. The energy rays tracking device is of a type such as that disclosed in my co-pending application Ser. No. 921,198 filed July 3, 1978 and which disclosure is incorporated herein for all purposes.

DESCRIPTION OF A SECOND PREFERRED EMBODIMENT

Figure 12:
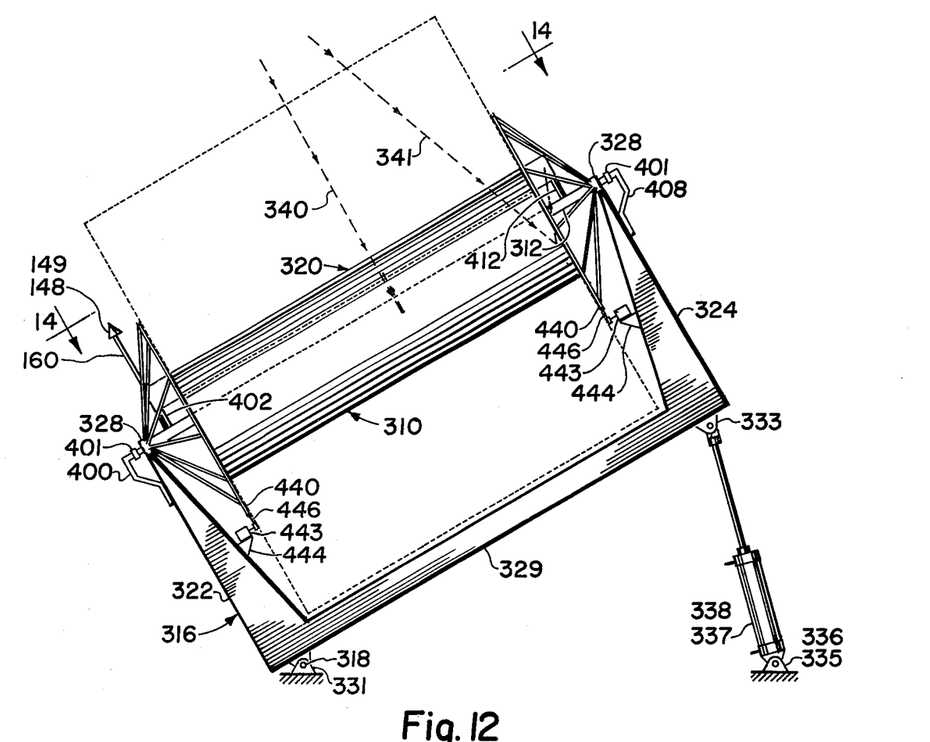
FIG. 12 is a front elevational view of solar energy collector with a linear parabola shaped mirror and support assembly.
Figure 13:
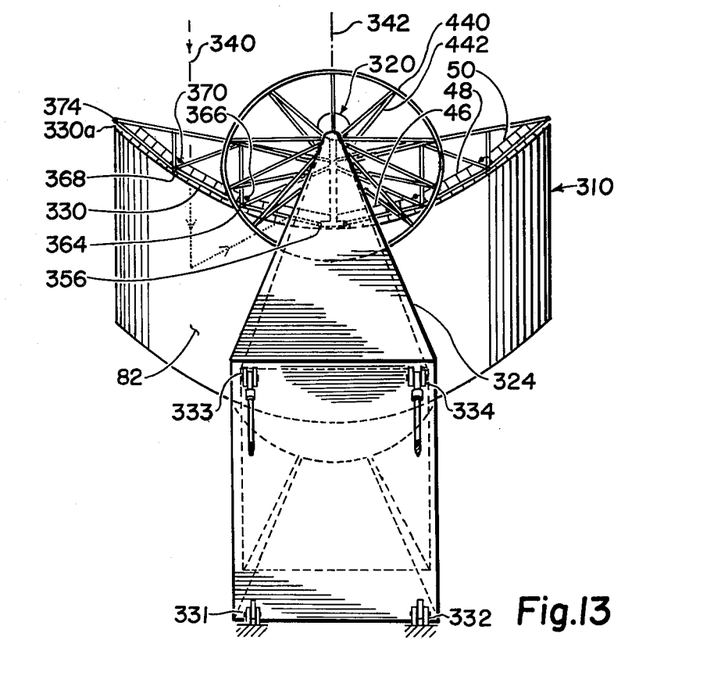
FIG. 13 is a right side elevational view thereof.
Figure 14:
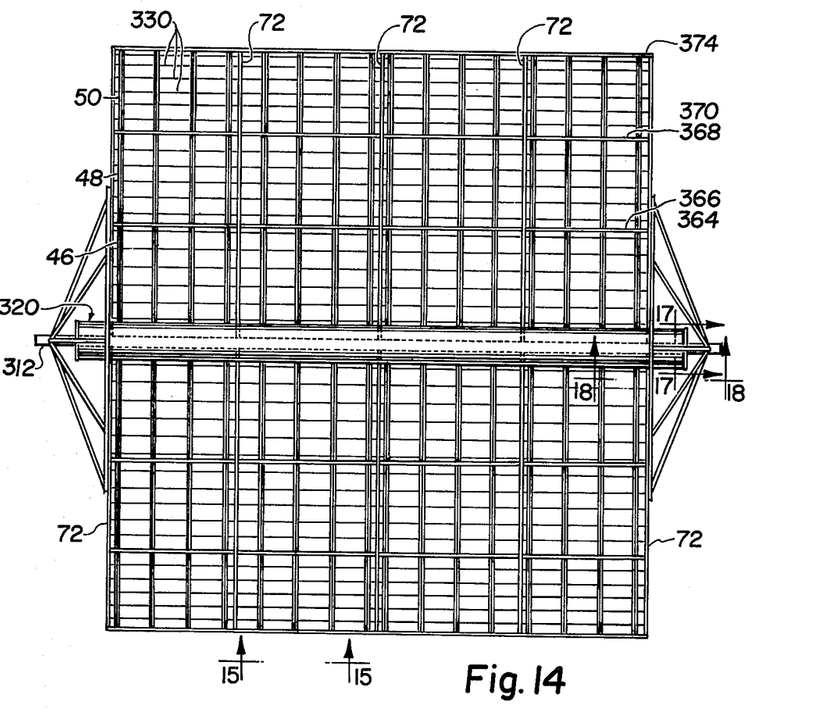
FIG. 14 is an enlarged view taken along line 14—14 of FIG. 12.

Referring to FIGS. 12–14, the solar energy collector generally comprises a linear parabola shaped mirror 310 pivotally supported by inclined shaft 312 which is pivotally secured to a support assembly generally designated 316. The support assembly 316 may be either rigidly fixed in position or pivotal about a horizontally positioned centerline 318.

The linear parabola shaped mirror 310 reflects light and infrared energy rays toward the linear collector assembly 320 which is located around the focal line of the mirror.

The support assembly 316 generally comprises upwardly extending support structures 322 and 324 having triangular shapes and being located at each end of mirror 310. A bearing 328 is secured at the top apex of support structures to support shaft 312. Support structure 322 and 324 may be separately extended downward and anchored in a fixed base where the support assembly 316 is to be rigidly fixed in position provided alignment and separation between bearings 312 can be maintained. Support structures 322 and 324 are secured to each side of a lower structure 329 when support assembly 316 is to be pivotally mounted. Pivots 331 and 332 located on the bottom and at one side of lower structure 329 provides for rotation of support assembly 316 about centerline 318. Moveable pivots 333 and 334 located on the bottom and at the opposite side of lower structure 329 are moved relative to pivots 335 and 336 by jacking means 337 and 338. Jacking means 337 and 338 are controlled such that they have equal movements to prevent torsional loading of lower structure 329.

The linear parabola shaped mirror frame is similar to the circular paraboloid shaped mirror frame except symetrically arranged straight supports 330 and 330a as illustrated in FIGS. 13 and 14 replace concentrically arranged support rings 30 and 30a as illustrated in FIGS. 5–9.

Figure 5:
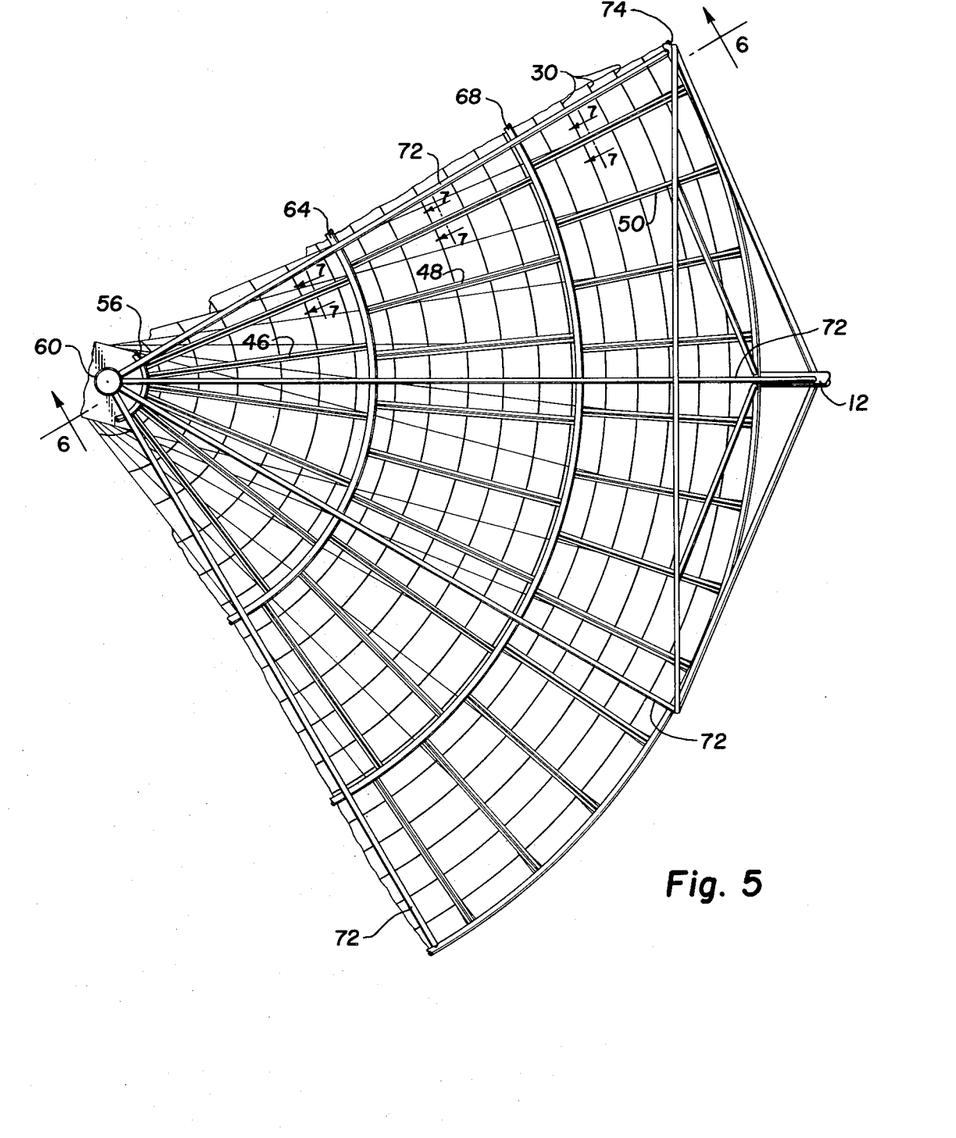
FIG. 5 is an enlarged view of a portion of the circular paraboloid shaped mirror and the structure of same with parts broken away to more clearly illustrate the details of construction.

The primary support for straight supports 330 and 330a of the linear parabola shaped mirror frame is similar to the primary support for the circular paraboloid shaped mirror frame except symetrically arranged straight connectors 356, 364, 366, 368, 370 and 374 as illustrated in FIGS. 13 and 14 replace concentrically arranged connector rings 56, 64, 66, 68, 70 and 74 as illustrated in FIGS. 5 and 6. The bar joist 46, 48 and 50 are identical in construction for both mirror forms; however, they are assembled in a parallel configuration in the linear parabola shaped mirror as illustrated in FIG. 14.

Figure 15:
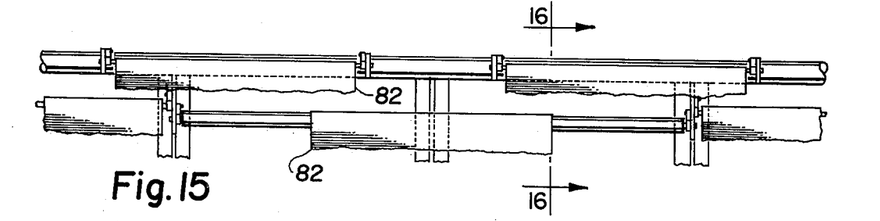
FIG. 15 is an enlarged view taken along line 15—15 of FIG. 14.
Figure 16:
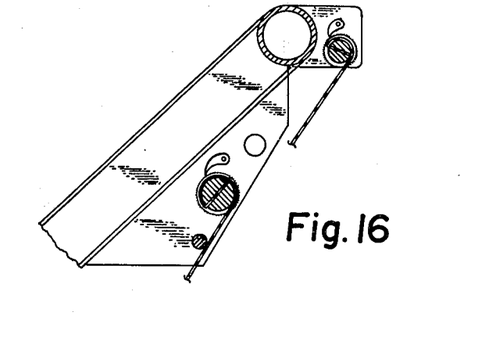
FIG. 16 is an enlarged cross-sectional view taken along line 16—16 of FIG. 15.
Figure 18:
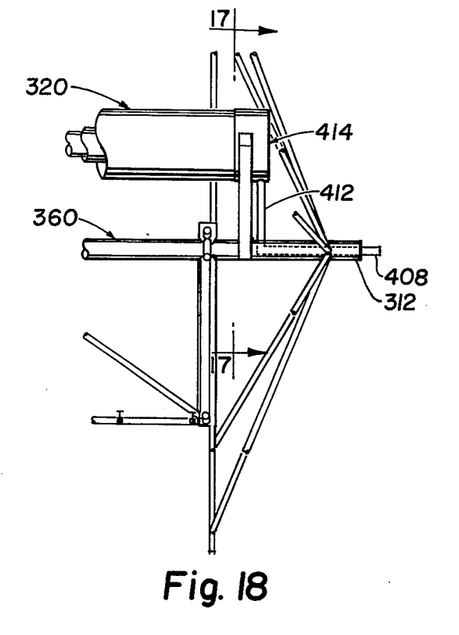
FIG. 18 is an enlarged cross-sectional view taken along line 18—18 of FIG. 14; and, FIG. 19 is an enlarged cross-sectional view taken along line 19—19 of FIG. 17.

The linear collector assembly 320, which is located around the focal line of mirror 310, is supported only at the ends by linear support structure 360 as illustrated in FIG. 18. Straight supports 310 are adjustable such that the area of exposed flexible reflective film 82 between any pair of supports will reflect the light and infrared energy rays received from the sun to strike the linear collector assembly 320. Direction of typical rays are shown in dashed outline in FIGS. 12 and 13. Typical ray path 340 is shown at noon when the sun is at the equinox position; and, fixed support assembly 316 is positioned as indicated relative to ray path 340 for minimum inclination of ray paths relative to the focal line of the mirror during the sun's summer and winter solstic positions. Typical ray path 341 is shown at noon when the sun is at the winter solstic position to illustrate why the linear collector assembly 320 extends past the edge of mirror 310. The pivotal support assembly 316 is adjusted whereby the typical ray path is at a right angle to the focal line of the mirror at noon everyday. In all cases the typical ray path is parallel to the geometrical plane 342 of mirror 310 as illustrated in FIG. 13. A number of strips of film 82 are installed between rollers 85 spaced along the length of the linear parabola shaped mirror as best illustrated in FIGS. 15 and 16. The number of strips of film 82 is determined by the length of the mirror. The film strips are secured and tensioned in a similar manner to those used in the circular paraboloid shaped mirror.

An inlet line 400 carries the heat transfer media to the linear collector assembly 320 by way of a swivel connection 401 which allows continuous rotation of mirror 310 with shaft 312 as shown if FIG. 12. Fluid passes through inlet line 400 positioned through shaft 312, through the end of linear support structure 360 and then to linear collector assembly 320. Supply tube 402 communicates with inlet line 400 and inlet manifold 404. An outlet line 408 is secured in a similar manner through swivel connection 401 through shaft 312 through the opposite end of linear support structure 360 to outlet tube 412 which communicates with outlet manifold 414 as shown in FIGS. 12, 17, 18 and 19.

Figure 17:
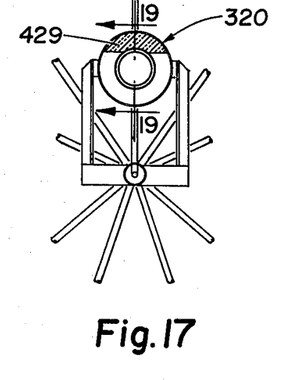
FIG. 17 is an enlarged cross-sectional view taken along line 17—17 of FIG. 14.
Figure 19:
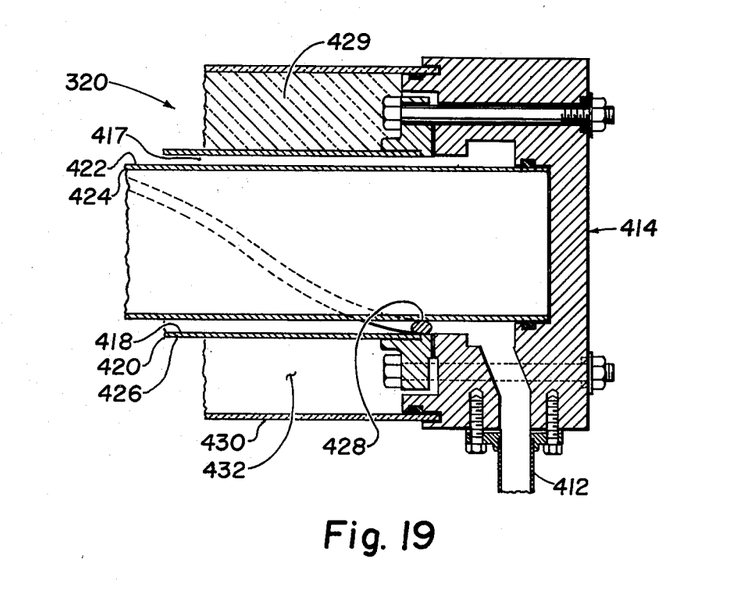

Referring to FIG. 19 inlet manifold 404 communicates with outlet manifold 414 through an annular space 417 formed between the inside surface 418 of heat conductor pipe 420 and the outside surface 422 of heat barrier pipe 424. The outside surface 426 of heat conductor pipe 420 is coated with a black compound such as to cause maximum absorption of heat from light/infrared energy rays striking same. Heat absorbed in the outside surface 426 of heat conductor pipe 420 is conducted to the inside surface 418 where the heat is absorbed by a passing heat transfer media in contact with same. A spirally formed turbulator 428 is installed within the annular space 417 to cause the passing heat transfer media to spiral around the annulus as it travels through same to effect maximum heat transfer. Insulation 429 is installed as indicated in FIGS. 17 and 19 to minimize heat losses by convection and conduction. A transparent lens 430 provides a cover and a partial vacuum is formed in the space 432 between the transparent lens 430 and the outside surface 426 of heat conductor pipe 420 to minimize convection heat losses. The heat transfer media is utilized in a similar manner to that described in the First Preferred Embodiment.

Means to provide rotational movement of the linear parabola shaped mirror 310 generally comprises a ring 440 supported by spokes 442 on shaft 312 best shown in FIG. 13. A reversible motor 443 is secured on a support member 444 to upwardly extending support structure 322 on each end of support assembly 316 and is drivingly connected by a roller chain or other connector means 446 to the ring 440 similar to that indicated in the First Preferred Embodiment. Activation of reversible motors 443 results in rotation of shaft and mirror 310 secured rigidly thereto is capable of being rotated through 360 degrees as illustrated in FIGS. 12 and 13 by dashed outline of the mirror. Means to provide changes in the inclination of shaft 312 with respect to the horizon comprises pivotal movement of support assembly 316 in a vertical rotational direction around pivots 331 and 332 with movement of the elevated end of support assembly 316 being provided by jacking means 337 and 338 which provide controlled linear motion between pivots 333 and 335 and between pivots 334 and 336 all as best illustrated in FIGS. 12 and 13. Motors 443 are simultaneously actuated by an energy rays tracking device to maintain the geometrical plane 342 of the linear parabola shaped mirror 310 in alignment with the center of the sun for optimum energy collection. Additionally simultaneous action of jacking means 337 and 338 is controlled manually or automatically by the energy rays tracking device for movement of the support assembly 312, with mirror 310 rotatably supported by same, whereby the direction of the mirror focal and vertex lines are maintained at a right angle to the direction of a typical light/infrared energy ray.

Means to clean the surface of mirror 310 is identical to that described in the First Preferred Embodiment with the spray heads being located across the top surface of support assembly 316 or the fixed base and positioned facing upward to clean mirror 310 when it is in an inverted position.

The light/infrared energy rays receiving means 148 of the energy rays tracking device is for bidirectional movement of the mirror and receiving means 149 is for unidirectional movement. Either receiving means is to be rigidly attached to mirror 310 using staff 160 as illustrated in FIG. 12.

Having described my invention, I claim:

1. Solar energy collection device for concentrating light and infrared energy rays onto a small surface area whereby energy resulting from said energy rays striking said small surface area is utilized by various means to accomplish useful work comprising: a plurality of symetrically arranged supports, said supports forming a parabola shaped frame; support means rotatably supporting said parabola shaped frame and maintaining the direction of an axial plane of said parabola shaped frame in alignment with the direction of light and infrared energy rays arriving from the sun; means adjustably supporting said supports to said support means; said means adjustably supporting said supports comprising a plurality of threaded shaft secured at spaced intervals about said supports and means to move said threaded shaft relative to said support means; a plurality of flexible strips of film, said strips having an upper reflective surface with said upper reflective surface bearing against the supports, said strips being positioned across said supports from the outer support of said parabola shaped frame to the opposite side of the support through the center of said parabola shaped frame, means to tension said strips over said support, said reflective film further arranged to form a parabola shaped mirror surface to reflect said light and infrared energy rays to the focus of said reflective film strips; and a collector assembly secured at the focus of said parabola shaped mirror and adapted to receive said light and infrared energy rays.

2. The combination called for in claim 1 wherein the collector assembly comprises: a plurality of tubes arranged in the helical path to form a semi-spherical surface; an inlet manifold; an outlet manifold the other end of said tubes communicating with the outlet manifold; insulation material secured on the inner surface of said tubes; a heat transfer coating secured over said tubes; a transparent lens spaced out from the semispherical surface formed by said tubes, and with said space being partially evacuated of air to prevent heat loss therefrom.

3. The combination called for in claim 2 wherein the heat transfer coating comprises: a composition of carbon black and a refractory material.

4. The combination called for in claim 1 wherein the support means comprises: a center support structure; a plurality of radially extending members secured between said center support structure and said outermost support; a shaft rigidly secured to one or more of said radially extending members; a support assembly; and bearing means rotatively supporting said shaft on said support assembly.

5. The combination called for in claim 4 wherein means to rotate said shaft with said support means and with said paraboloid shaped frame being rigidly secured thereto comprises: circular shaped rings supported by spokes on said shaft; motors rigidly secured to said support assembly; and a means drivingly connecting said circular shaped rings with drive shaft of said motor to cause rotation of said circular parabola shaped frame when said motors are actuated in consonance with a sun tracking device.

6. The combination called for in claim 5 wherein means to rotate said support means along with said shaft around a center pivot comprises: cross axle members of said support assembly positioned such that a plane which is common with both axle centers is perpendicular to centerline of said pivot; wheels located on the outward ends of each cross axle equal distant from said center pivot and restrained from movement in a vertical direction; motors rigidly secured to said support assembly; and a means drivingly connecting said wheels with drive shaft of said motor to cause rotation of said wheels which inturn causes rotation of said support assembly about said pivot centerline when said motors are actuated in consonance with a sun tracking device.

7. The combination called for in claim 1 with the addition of: means to clean the surface of the mirror comprising a source of cleaning fluid; a conduit communicating with a source of cleaning fluid; and spray heads communicating with said conduit adapted to spray the cleaning fluid on the surface of the mirror when it is inverted and being rotated about the bearing pivot at night in preparation for the following days solar energy collection sequence.

8. The combination called for in claim 1 wherein said symetrically arranged supports comprise: straight supports.

9. The combination called for in claim 1 wherein said symetrically arranged supports comprise: concentrically arranged rings.

10. The combination called for in claim 1 wherein said support means rotatably supporting said parabola shaped frame comprises: a shaft secured to said parabola frame; means supporting said shaft; circular shaped rings supported by spokes on said shaft; motors supported by means supporting said shaft; driving means connecting drive shafts to said motors with said circular shaped rings to cause rotation of said shaft with said parabola shaped frame attached thereto.

11. The combination called for in claim 10 wherein said means supporting said shaft comprise: a U shaped member, the legs of which are spaced apart and face away from the axis of the ring such that said driving means installed in contact with web of said U shaped member between said legs is restrained from lateral movement in a direction parallel to said axis; and teeth secured to the web of said U shaped member between said legs engaged with openings within said driving means where by tangential movement is restrained between said circular shaped ring and said driving means thereby causing movement of said U shaped member along with said driving means without slippage.

12. The solar energy collection device for heating the heat transfer media comprising: a plurality of symetrically arranged straight supports, said straight supports forming a linear parabola shaped frame; parallel extending support means supporting said straight supports; shaft means secured to said support means to rotatably support said linear parabola shaped frame; means supporting said shaft means and adapted to rotate about a single pivot means or being fixed; means to adjust the distance between said straight support and said parallel extending support means; a plurality of reflective film strips secured across said straight supports through the center of said linear parabola shaped frame to form a reflective surface of the mirror; means to adjustably secure said reflective film strips to said straight supports, said means being positioned at the outermost straight supports; and a linear collector assembly secured around the focal line of said mirror and adapted to transfer heat to the media flowing therethrough.

13. The combination called for in claim 12 wherein the parallel extending support means comprises the plurality of parallel extending trusses; a linear support structure secured to the inner end of an inner group of said trusses; an outer straight connector secured to the outer end of an outer group of said trusses; and with intermediate straight connectors secured between groups of said trusses.

14. The combination called for in claim 12 wherein the means to adjustably support said straight supports relative to said parallel extending support means comprises: a plurality threaded shaft secured to said straight supports; a plurality threaded openings in said parallel extending support means adapted to receive said threaded shafts such that the distance between the parallel extending support means and the straight supports may be adjusted by turning said threaded shaft.

15. The combination called for in claim 12 wherein means to rotatably support said shaft means comprises: a triangualar shaped support structure rotatably secured on each end of said shaft means; circular shaped rings supported by spokes on said shaft means; motors supported by said triangular shaped support structure; means driving connecting drive shaft of said motors with said circular shaped rings to rotate said shaft means with said mirror attached thereto.

16. The combination called for in claim 15 wherein means to pivotally support said triangular shaped support structure secured to a lower structure comprises: first pivots at one side of said lower support structure constrained from all lateral movement around which said solar energy collection device is allowed to rotate whereby the angle between the horizontal direction and the centerline direction of said shaft means is adjustable; second pivots at the opposite side of said lower support structure constrained from lateral movement only in a direction parallel to the centerline of said pivots; jacking means drivingly connecting between said second pivots and third pivots, said third pivots constrained form all lateral movement and being fixed to a base with same distance from first pivots as the distance form the first and second pivots, said jacking means provides controlled separation between said second and third pivots to provide desired inclination of said shaft to the horizon.

17. The combination called for in claim 15 wherein said triangular shaped support structures are rigidly secured to a fixed base.

* * * * *